(12) United States Patent
Hardee et al.

(10) Patent No.: US 10,953,647 B2
(45) Date of Patent: Mar. 23, 2021

(54) METHODS AND SYSTEMS FOR DETECTING AND RECTIFYING FAULTS IN 3D PRINTING PROCESSES

(71) Applicant: INTERNATIONAL BUSINESS MACHINES CORPORATION, Armonk, NY (US)

(72) Inventors: Christopher J. Hardee, Raleigh, NC (US); Shikhar Kwatra, New York City, NY (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 485 days.

(21) Appl. No.: 15/400,094

(22) Filed: Jan. 6, 2017

(65) Prior Publication Data

US 2018/0194075 A1    Jul. 12, 2018

(51) Int. Cl.
| | |
|---|---|
| *B33Y 10/00* | (2015.01) |
| *H04N 1/00* | (2006.01) |
| *B33Y 50/02* | (2015.01) |
| *B33Y 30/00* | (2015.01) |
| *B29C 64/386* | (2017.01) |
| *G05B 19/418* | (2006.01) |

(52) U.S. Cl.
CPC ............ *B33Y 10/00* (2014.12); *B29C 64/386* (2017.08); *B33Y 30/00* (2014.12); *B33Y 50/02* (2014.12); *G05B 19/41875* (2013.01); *H04N 1/00803* (2013.01); *H04N 1/00827* (2013.01); *G05B 2219/49023* (2013.01); *G05B 2219/49036* (2013.01); *H04N 2201/0081* (2013.01); *H04N 2201/0084* (2013.01)

(58) Field of Classification Search
CPC ...................................................... B29C 67/00
See application file for complete search history.

(56) References Cited

U.S. PATENT DOCUMENTS

| | | | |
|---|---|---|---|
| 7,766,641 B2 | 8/2010 | Silverbrook | |
| 9,327,537 B2 | 5/2016 | Conrow et al. | |
| 9,998,931 B2 * | 6/2018 | Dow | G05B 19/4099 |
| 2014/0107823 A1 | 4/2014 | Huang | |

(Continued)

FOREIGN PATENT DOCUMENTS

WO    2015055550 A1    4/2015

OTHER PUBLICATIONS

Islam et al., "An Investigation of Dimensional Accuracy of Parts Produced by Three-Dimensional Printing," Proceedings of the World Congress on Engineering 2013 vol. I, WCE 2013, Jul. 3-5, 2013 (4 pages).

*Primary Examiner* — Tejal Gami
(74) *Attorney, Agent, or Firm* — Griffiths & Seaton PLLC

(57) ABSTRACT

Embodiments for 3D printing an object by a processor are described. During a 3D printing process to form a 3D printed object, an at least partially completed 3D printed object formed by the 3D printing process is scanned. An error on the at least partially completed 3D printed object is detected based on the scanning of the at least partially completed 3D printed object. The error on the at least partially completed 3D printed object is corrected. The correcting of the error includes causing at least some material from the partially completed 3D printed object to be removed.

12 Claims, 10 Drawing Sheets

(56) References Cited

U.S. PATENT DOCUMENTS

2015/0312119 A1 10/2015 Liu et al.
2016/0263824 A1 9/2016 Roscoe
2016/0368220 A1* 12/2016 Dimatteo ........... G05B 19/4099

* cited by examiner

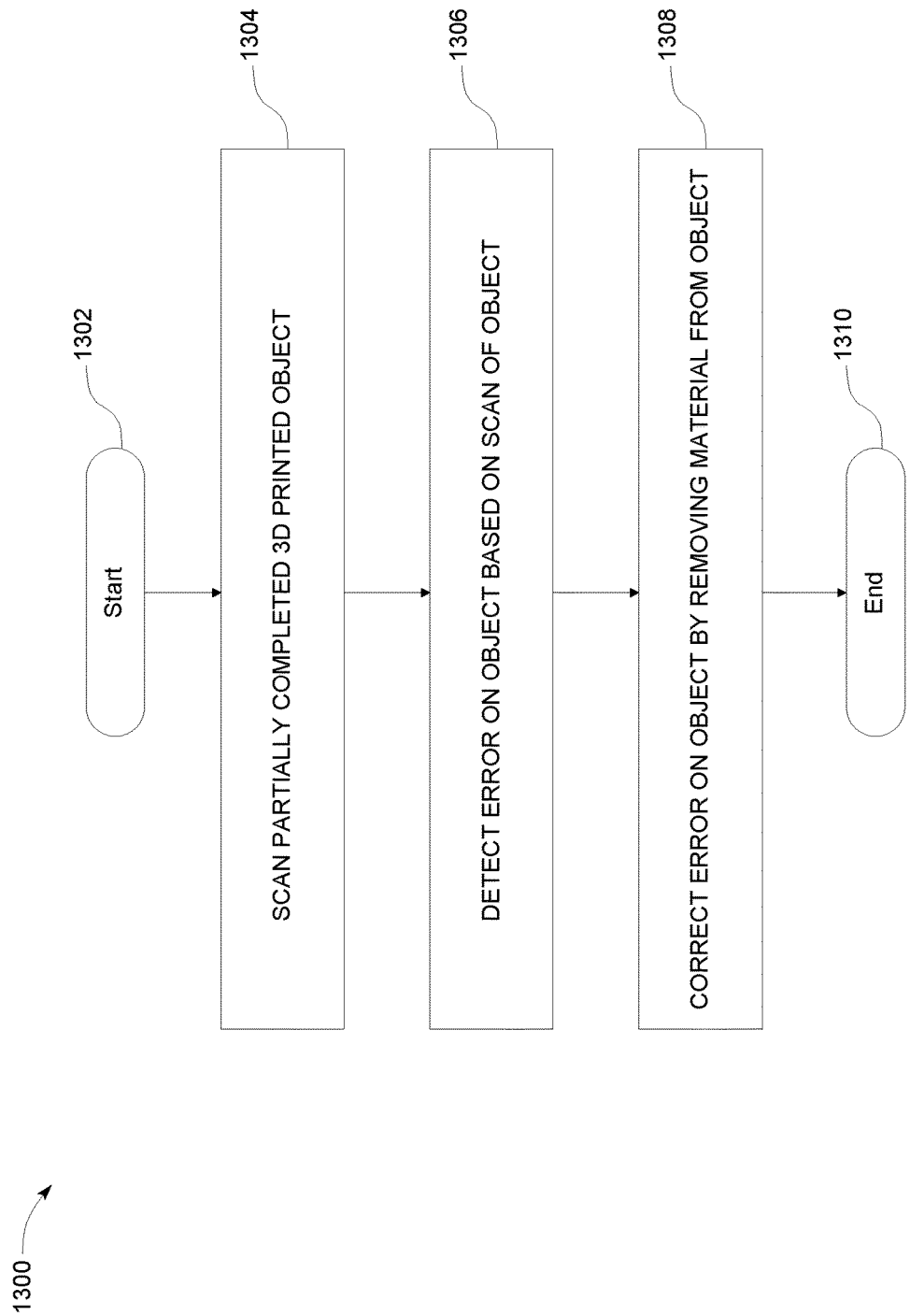

METHODS AND SYSTEMS FOR DETECTING AND RECTIFYING FAULTS IN 3D PRINTING PROCESSES

BACKGROUND OF THE INVENTION

Field of the Invention

The present invention relates in general to computing systems, and more particularly, to various embodiments for detecting and rectifying faults in a 3D printing process used to form a 3D printed object.

Description of the Related Art 3D printing is a relatively new process of making solid, three dimensional objects from a digital file. 3D printing processes typically create the object using an additive process in which successive layers of material are laid down or deposited until an object with the desired size and shape is formed. Each of these layers may be considered to be a very thin horizontal cross-sectional "slice" of the end product.

As 3D printing becomes more common, there is a need to provide 3D printing systems with the ability to detect and correct errors (or faults or defects) in the 3D printing process in order to, for example, reduce wasted time and material.

SUMMARY OF THE INVENTION

Various embodiments for 3D printing an objet by a processor are described. In one embodiment, by way of example only, a method for 3D printing an object, again by a processor, is provided. During a 3D printing process to form a 3D printed object, an at least partially completed 3D printed object formed by the 3D printing process is scanned. An error on the at least partially completed 3D printed object is detected based on the scanning of the at least partially completed 3D printed object. The error on the at least partially completed 3D printed object is corrected. The correcting of the error includes causing at least some material from the partially completed 3D printed object to be removed.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 13 is a flowchart diagram depicting an exemplary method for 3D printing an object in which various aspects of the present invention may be implemented.

DETAILED DESCRIPTION OF THE DRAWINGS

Figure 1:
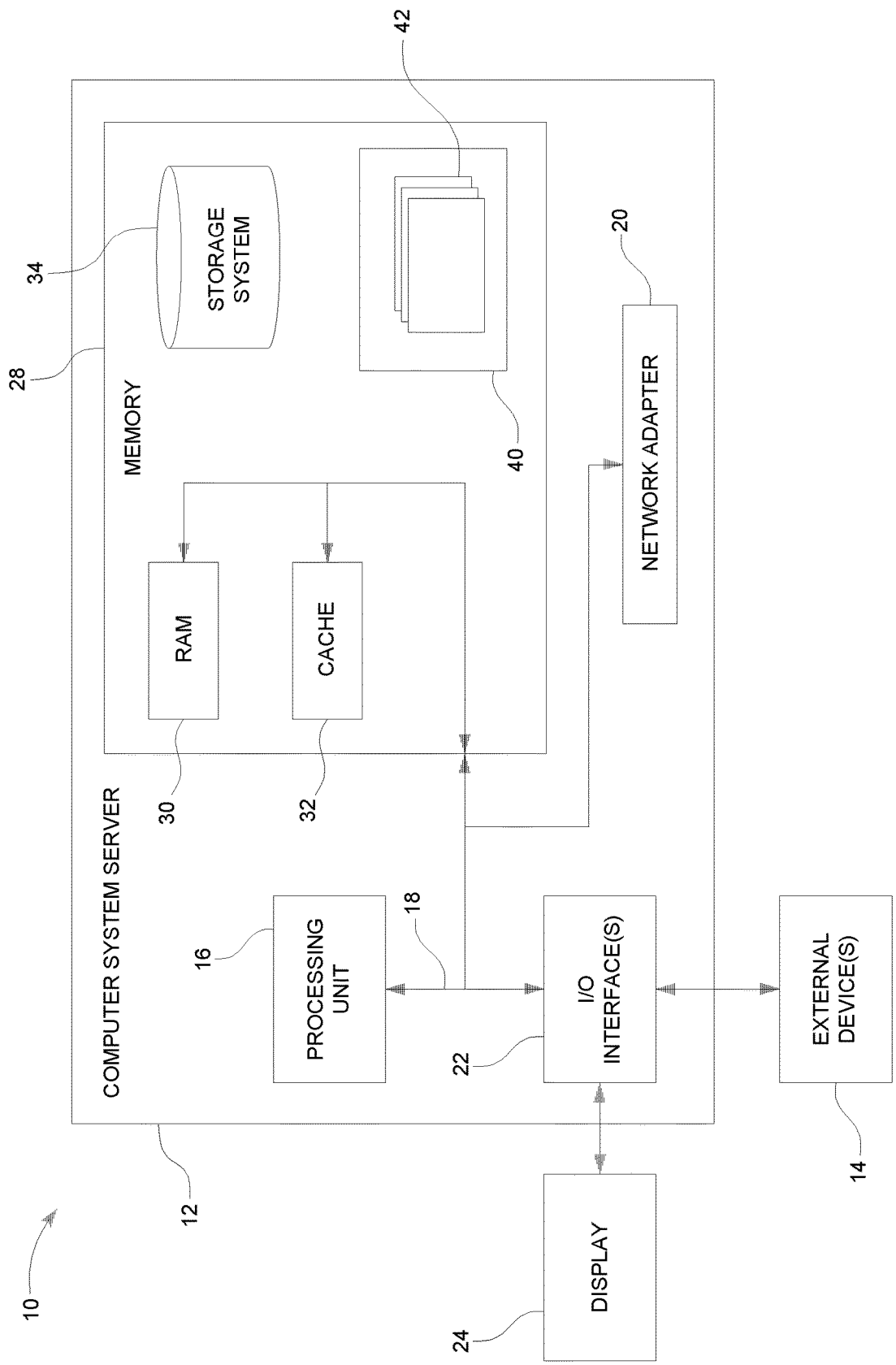
FIG. 1 is a block diagram depicting an exemplary computing node according to an embodiment of the present invention.

As previously indicated, as 3D printing becomes more common, there is a need to provide 3D printing systems with the ability to detect and correct errors (or faults or defects) in the 3D printing process in order to, for example, reduce wasted time and material.

For example, most conventional 3D printing systems are not able to interact with the object being printed during the printing process. As a result, if a defect within the object formed during the process, the printer may continue to add material to the object to further the process, which depending on the type of defect, may cause additional problems in the final object. That is, a defect in one of the lower layers of the object may exacerbate any defects formed in the subsequent layers. Moreover, if the defect is in the form of unwanted material (e.g., a portion of the material that should not be occupied by the printed material), even if it is detected, most 3D printing systems have no way of correcting the problem so that the completed object has the desired size and/or shape.

In view of the foregoing, a need exists for 3D printing methods and systems that monitor the 3D printing process, determine whether or not any defects (or errors) have manifested, and have the ability to correct the defects, particularly in cases in which unwanted material has been deposited.

To address these needs, the methods and systems of the present invention use, for example, sensors to scan (or monitor) the 3D printing process, determine whether or not any defects have been formed in the portion(s) of the object that have already been deposited (or formed), and correct the defects. As described below, in some embodiments, the correcting of the defect(s) includes removing at least some material from the portion(s) of the object that has already been deposited.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a 3D printing device (or 3D printer). For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
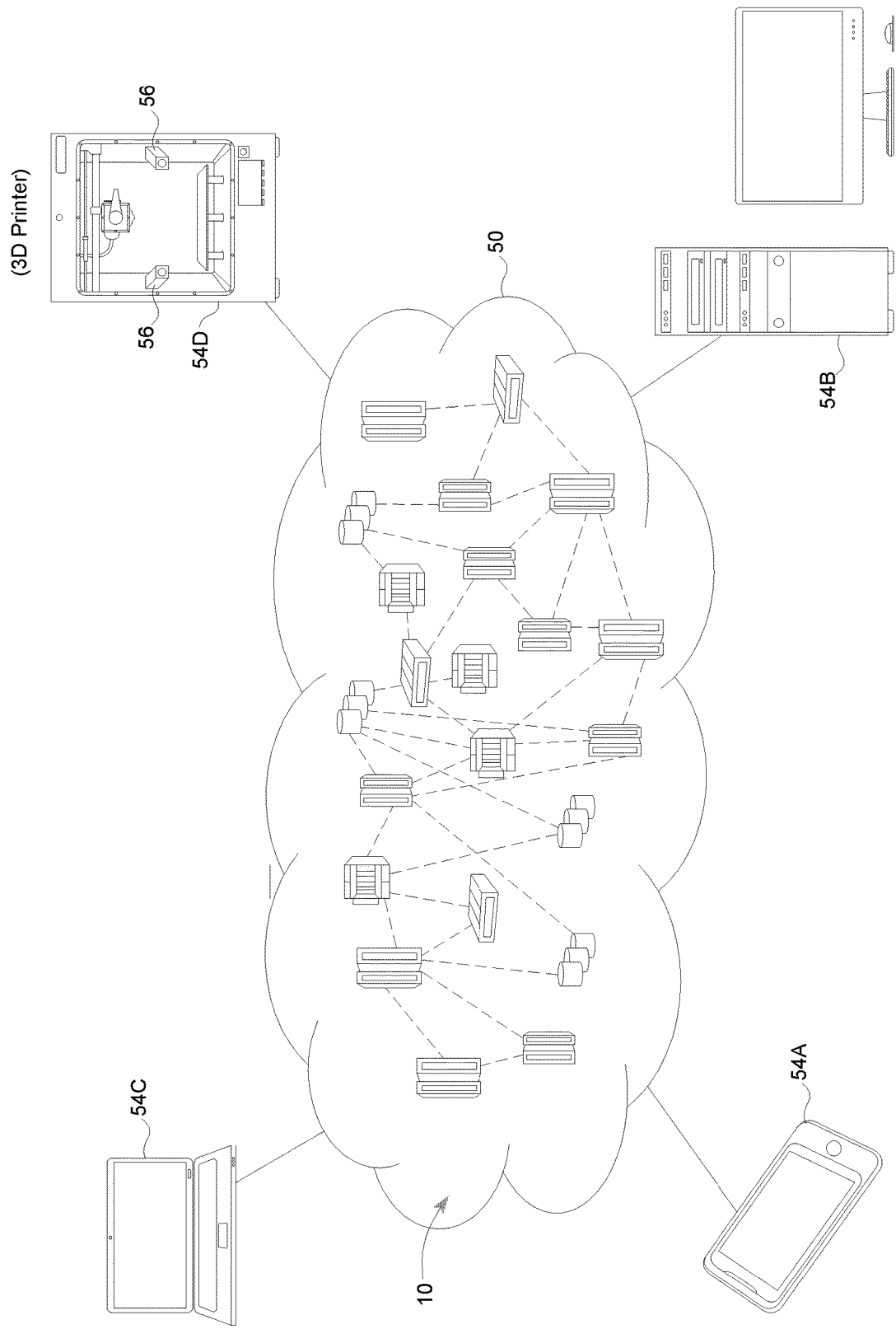
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA), cellular telephone, or tablet 54A, desktop computer 54B, and/or laptop computer 54C, as well as 3D printer 54D, may communicate. In one example, sensors 56 are coupled to 3D printer 54D (and/or a computing system within 3D printer and/or the other computing devices within cloud computing environment 50). For example, the sensors 56 may be installed on an interior of the 3D printer in such a manner to scan the object being created during the 3D printing process and/or otherwise monitor the 3D printing process. The sensors 56 may be, for example, cameras (e.g., visible light cameras), infrared sensors (or cameras), X-ray sensors (or cameras), ultrasonic modules, or any other type of sensor/device suitable for monitoring the 3D printing process.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-D shown in FIG. 2 are intended to be illustrative only and that computing nodes 10 and cloud computing environment 50 can communicate with any type of computerized device over any type of network and/or network addressable connection (e.g., using a web browser).

Figure 3:
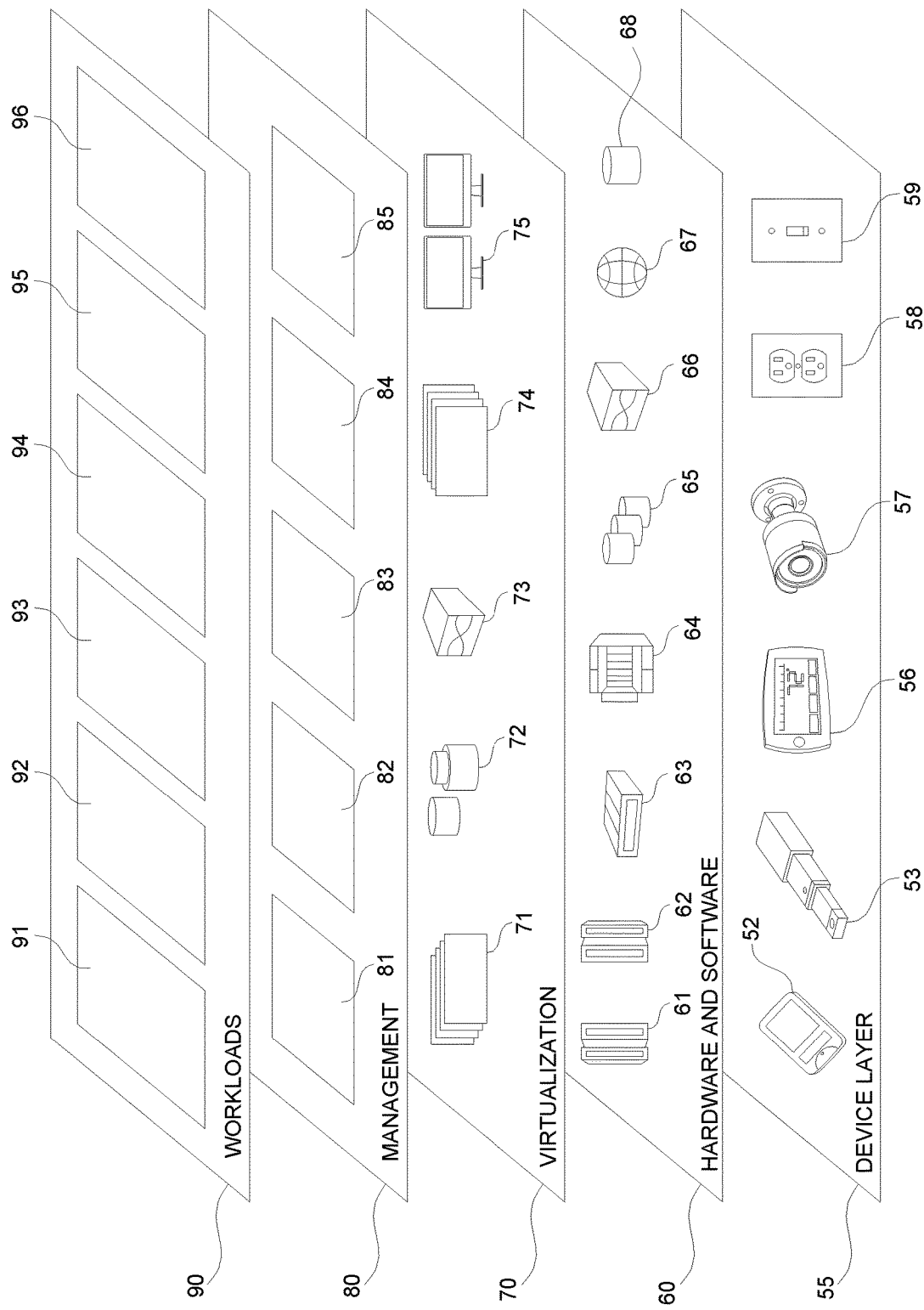
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to 3D printers, and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various object scanning and defect correcting workloads and functions 96 for scanning a 3D printed object (e.g., a partially completed 3D printed object) using, for example, sensors 56 coupled to 3D printer 54D and a device configured to correct defects on the object. One of ordinary skill in the art will appreciate that the image processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for 3D printing objects. In some embodiments, during a 3D printing process to form a 3D printed object, an at least partially completed 3D printed object formed by the 3D printing process is scanned. An error on the at least partially completed 3D printed object is detected based on the scanning of the at least partially completed 3D printed object. The error on the at least partially completed 3D printed object is corrected. The correcting of the error may include causing at least some material from the partially completed 3D printed object to be removed.

In some embodiments, a 3D printing process is performed on the at least partially completed 3D printed object after the correcting of the error (e.g., the 3D printing process is continued after the error is corrected). The scanning of the partially completed 3D printed object may be performed by at least one sensor coupled to the 3D printer performing the 3D printing process. The sensor(s) may include a camera, an ultrasonic module, an X-ray sensor, and/or an infrared sensor. In some embodiments, the 3D printer also includes one or more removal tools configured to remove material from the (partially completed) 3D printed object. The removal tool may include, for example, a drill, a grinder, or a heating element.

The error may be detected by, for example, comparing the data (or information) collected during the scanning process to a digital file associated with the (final or desired) 3D printed object. In some embodiments, the error is related to additional and/or unwanted material on the portion(s) of the object that have been already deposited (or formed) (i.e., material on the at least partially completed 3D printed object that is not represented by the digital file associated with the 3D printed object).

Figure 4:
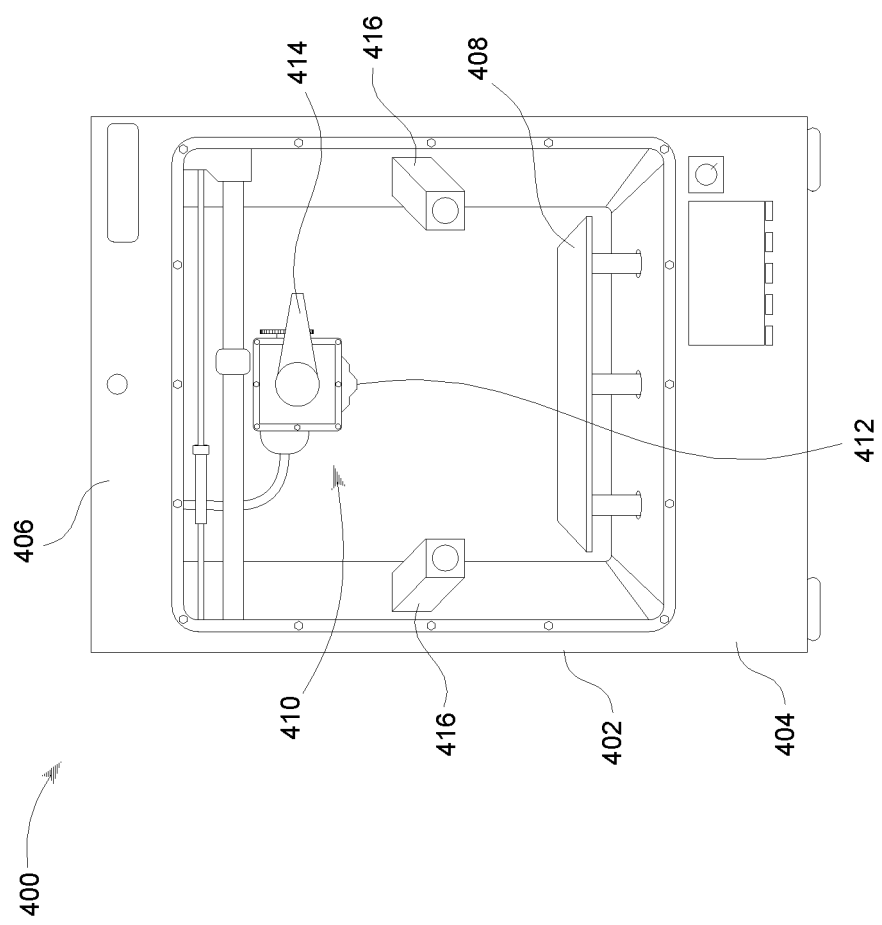
FIGS. 4 and 5 are side views of a 3D printer according to an embodiment of the present invention.

Referring to FIG. 4, an exemplary 3D printing system (or 3D printer) 400, according to some embodiments of the present invention, is shown. The 3D printer 400 includes a frame 402 with a lower portion 404 and an upper portion 406. The lower portion 404 houses a base (or support) 408 at a central portion thereof. The upper portion 406 of the frame 402 extends upwards from the lower portion 404 and includes a 3D printer head 410 as well as a series of members and/or actuators that support the 3D printer head 410, for example, above the base 408.

In the depicted embodiment, the 3D printer head 410 includes a nozzle (or dispenser) 412 and a material removal tool 414. Although not shown in detail, the 3D printer head 410 (and/or the nozzle 412) may be coupled to (and/or in fluid communication with) a source of a material(s) (e.g., plastics, polymers, metals, etc.) that is deposited/dispensed by the 3D printer head 410 (and/or the nozzle 412) during a 3D printing process. As will be appreciated by one skilled in the art, the 3D printer head 410 may be able to translate horizontally across the base 408 and/or vertically relative to the base 408 and deposit/dispense the material(s) (i.e., from the nozzle 412) in a manner suitable for 3D printing processes.

In the embodiment shown in FIG. 4, the removal tool 414 is coupled to the 3D printer head 410. Although not shown in detail, the removal tool may include any device (or tool) that is suitably configured for removing (and/or remolding and/or reshaping) the material that has been deposited by the 3D printer head 410. Examples of such devices include, but are not limited to, drills, grinders (e.g., grinding wheels), heating elements, lasers, cutting instruments (e.g., fixed blades or actuated saws), etc. (and any suitable actuators and/or power supplies). As will be described in greater detail below, as shown in FIG. 4, the removal tool 414 is in a "stored" (or un-deployed) position.

Still referring to FIG. 4, the 3D printer also includes sensors 416. In the example shown, the sensors 416 are housed within an interior of the 3D printer 400 (and/or the frame 402). The sensors 416 may be configured to scan an object being created during a 3D printing process being performed by the 3D printer (and/or monitor any object on the base 408). More specifically, in some embodiments, the sensors 416 are configured to scan (or monitor) an object being formed on the base 408 (or otherwise having a 3D printing process performed thereon) by the 3D printer head 410. The sensors 416 may be (or include), for example, cameras (e.g., visible light cameras), infrared sensors (or cameras), and/or X-ray sensors (or cameras), ultrasonic modules, or any other type of sensor/device suitable for monitoring the 3D printing process. Although only two sensors 416 are shown, it should be understood that additional (or fewer) sensors 416 may be utilized in other embodiments. It should also be understood that in some embodiments, at least one sensor (e.g., a camera) is included within the 3D printer head 410 (e.g., oriented in a direction parallel to that of the nozzle 412 and/or the removal tool 414).

Figure 5:
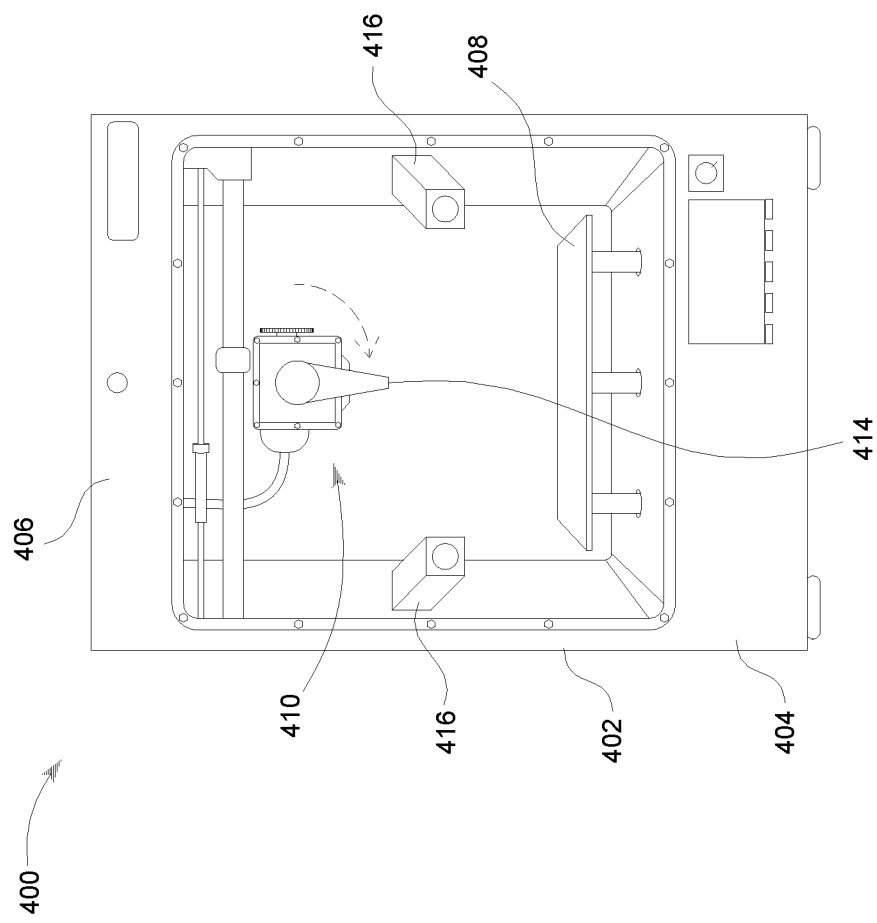

Referring now to FIG. 5, in some embodiments, the removal tool 414 is movably coupled (or connected) to the 3D printer 400 (e.g., the frame 402). As described above, in the depicted embodiment, the removal tool 414 is connected to the 3D printer head 410. More specifically, in the particular embodiment shown in FIGS. 4 and 5, the removal tool 414 is rotatably coupled to the 3D printer head 410 such that it can be rotated from the stored position (shown in FIG. 4) to a deployed position, shown in FIG. 5 (e.g., via an actuator that is not shown). In some embodiments, when the removal tool 414 is in the deployed position, an end (or work piece) thereof extends to a height that is lower than the tip of the nozzle 412 (FIG. 4). As will be described below, in some embodiments, when a correction is needed to an object undergoing a 3D printing process (or another object on the base 408), the removal tool 414 may be deployed and used to remove some material from and/or remold/reshape the object. It should be understood that in other embodiments, the removal tool 414 may not be coupled (directly) to the 3D printer head 410. For example, the removal tool 414 may be connected to the frame 402 through one or more separate supports (e.g., arms or tracks) in such a way that when it is deployed or in use, it is extended over the base 408, and when it is not in use, it is retracted into a position that is not over the base 408.

FIGS. 6-10 illustrate a 3D printing process according to some aspects of the present invention. In some embodiments, an object to be 3D printed is first selected (and/or an indication or signal representative of the selected object is received). The selection of the object may be performed using any suitable method, such as a manual selection on the 3D printer, through an electronic message (e.g., email, text, etc.), through a website/server, etc. In the embodiments described below and shown in FIGS. 6-10, the object being 3D printed is a model (or toy) dog. However, it should be understood that this is merely an example of a 3D printed object that may be formed, and in other embodiments, objects of other sizes, shapes, etc. may be formed using the 3D printing processes described herein.

Figure 6:
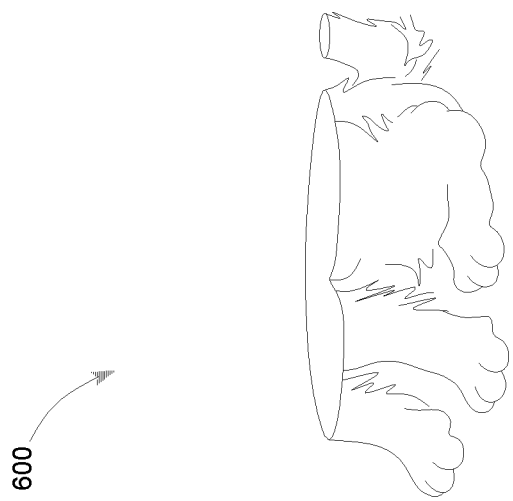

FIG. 6 illustrates a 3D printed object 600 during a relatively early stage of the 3D printing process used to form the object. As described above, the object 600 may be formed by the material being used to form the object 600 (e.g., a polymer) being deposited or dispensed (e.g., by the 3D printer head 410) in the appropriate size and shape based on the digital file associated with the object 600 being used by the 3D printer. In some embodiments, while the 3D printing process is being formed, the deposited material (e.g., the object 600) is, for example, repeatedly scanned by the sensors described above (e.g., sensors 416). The data received during the scanning is, for example, compared to the digital file being used to perform the 3D printing process. It should be understood that in the example shown in FIGS. 6-10, the completed object (e.g., the completed model dog) 600 shown in FIG. 10, and described below, may be representative of the digital file used to perform the 3D printing process. The 3D printing process (i.e., the deposition of the material) may proceed in a conventional manner so long as no (significant) defects or errors in the object 600 are detected by the scanning.

Figure 7:
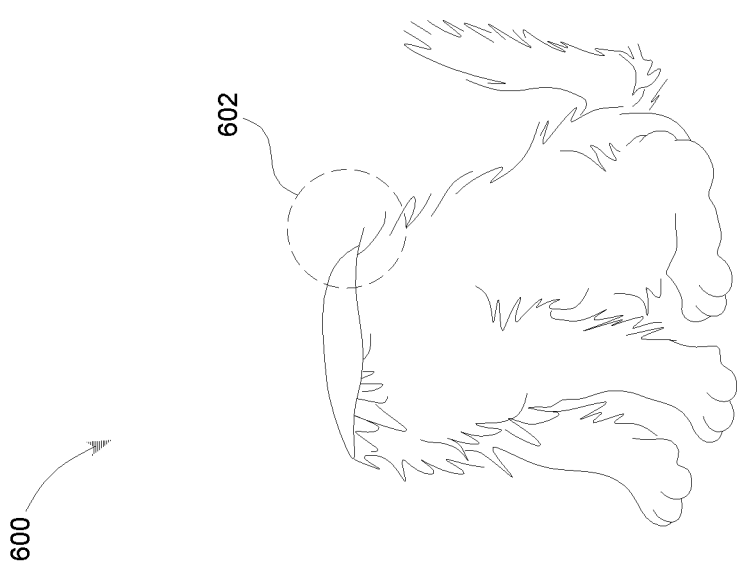
FIGS. 6-12 are simplified isometric schematic views illustrating 3D printing processes in accordance with aspects of the present invention.
Figure 10:

FIG. 7 illustrates the object 600 during a later stage of the 3D printing process (e.g., after additional layers of the material have been deposited). Of particular interest is that a defect (or error) has manifested (or formed) on the partially completed object 600, as indicated by circle 602. In the example shown, the defect is within the uppermost layer of the material that has been deposited. As is evident from comparing the object 600 in FIG. 7 with the completed object 600 shown in FIG. 10, the defect is in the form of "additional" or "unwanted" material (e.g., a protrusion). More specifically, in the example shown in FIG. 7, the defect has manifested because material has been deposited in a place that should not be occupied by the material (as shown in FIG. 10).

In some embodiments, after a defect is detected, a determination is made as to whether or not the 3D printing process (i.e., with respect to the particular object being formed) should be corrected and continued or abandoned altogether (e.g., and started over). The determination may be made based on, for example, the time and/or material used in the 3D printing process thus far, the time and/or material required to correct the defect and complete the 3D printing process, etc. Additionally, the determination may be based on an "expected" defect rate given the particular object being printed (e.g., complex shapes may be considered more likely to have defects than relatively simple shapes). Thus, depending on the exact nature of the defect, the resources that would be required to correct the defect, and/or the likelihood that additional defects will be encountered during the 3D printing process, the 3D printing process may be completely abandoned in favor of starting a completely new 3D printing process to form the desired object.

Figure 8:
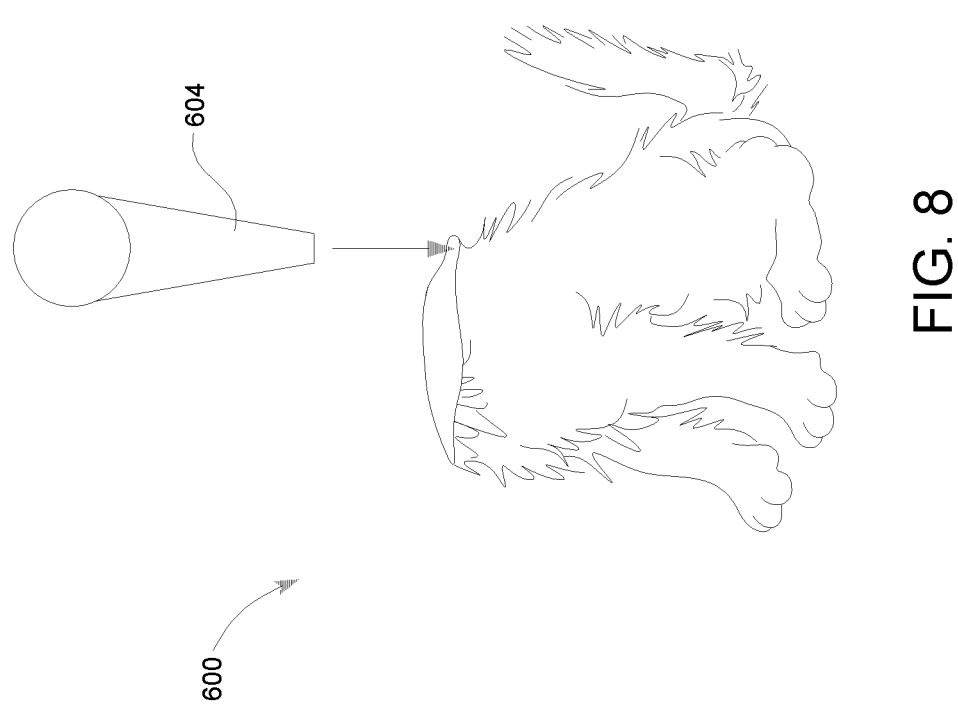

Referring now to FIG. 8, if the decision has been made to correct the defect, in some embodiments, a removal tool 604 (e.g., removal tool 414 in FIGS. 4 and 5), engages with the object 600 to correct the defect (e.g., remove the unwanted material). As described above, the removal tool 604 may include, for example, a drill, a grinder, a heating element, etc., and may be connected to the 3D printer head performing the 3D printing process. In the embodiment shown in FIG. 8, the removal tool is lowered to the object 600 from above. In some embodiments, the sensors continue to scan the object 600 while the removal tool is correcting the defect. In this manner, the system may control the removal tool 604 based on continuous updates from the sensors (i.e., in "real-time"). In some embodiments, such as those in which the removal tool 604 is separate from the 3D printer head performing the 3D printing process, the 3D printing process may continue while the defect is being corrected.

Figure 9:
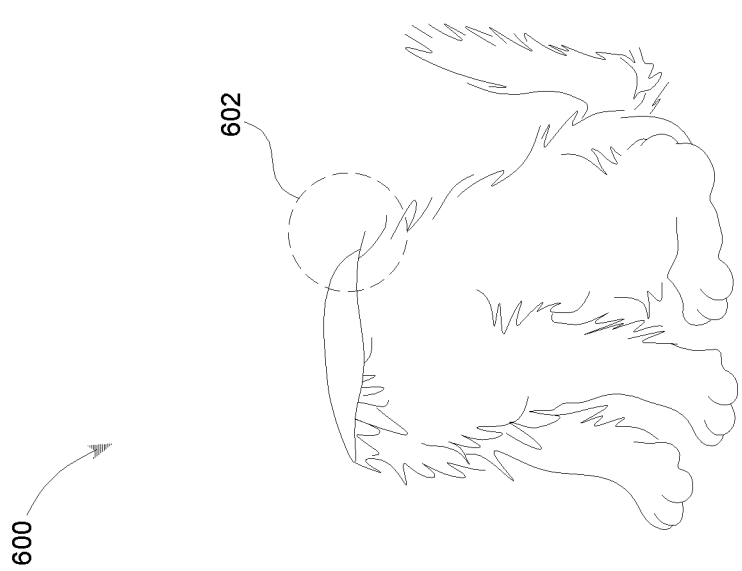

FIG. 9 illustrates the object 600 after the defect has been corrected. More specifically, in the depicted embodiment the unwanted material (e.g., the protrusion) has been removed by the removal tool 604, as indicated by the size/shape of the portion of the object indicated in circle 602. As is evident from comparing FIG. 9 to FIG. 10, the size/shape of the particular portion of the object 600 where the defect had manifested matches (or substantially matches) the size/shape of that portion of the object indicated by the digital file (i.e., as indicated by the object 600 in FIG. 10).

After the defect has been corrected, the 3D printing process may continue, and the material may be appropriately deposited onto the partially completed object to form the final, desired object 600, as shown in FIG. 10. It should be understood that in some embodiments, at any point during the 3D printing process, other defects (e.g., cracks) may be detected during the scanning of the object. In instances in which the defect(s) is relatively minor (e.g., a crack) and may be corrected without material being removed from the object, the 3D printing process may simply be altered in a manner suitable to correct the defect (e.g., adding material in an appropriate location to "fill in" the crack). Additionally, the scanning of the 3D object may indicate that the object is being formed in a manner that is not consistent with the desired object (or the digital file). For example, if the scanning of the object detects that the size and/or shape of the object is not progressing in a suitable manner (e.g., consistent with the digital file), the 3D printing process may be altered in an appropriate manner.

Figure 12:
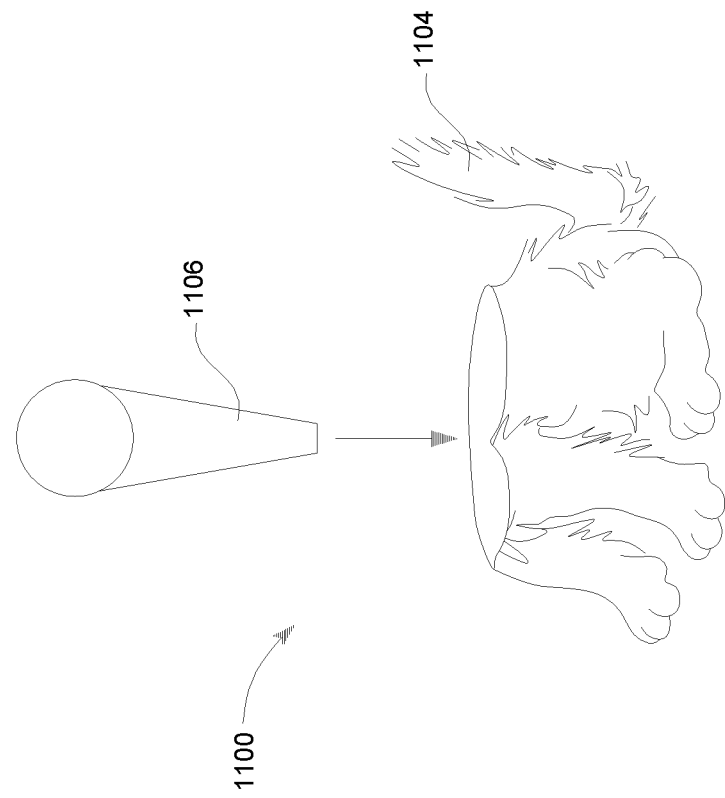
Figure 11:
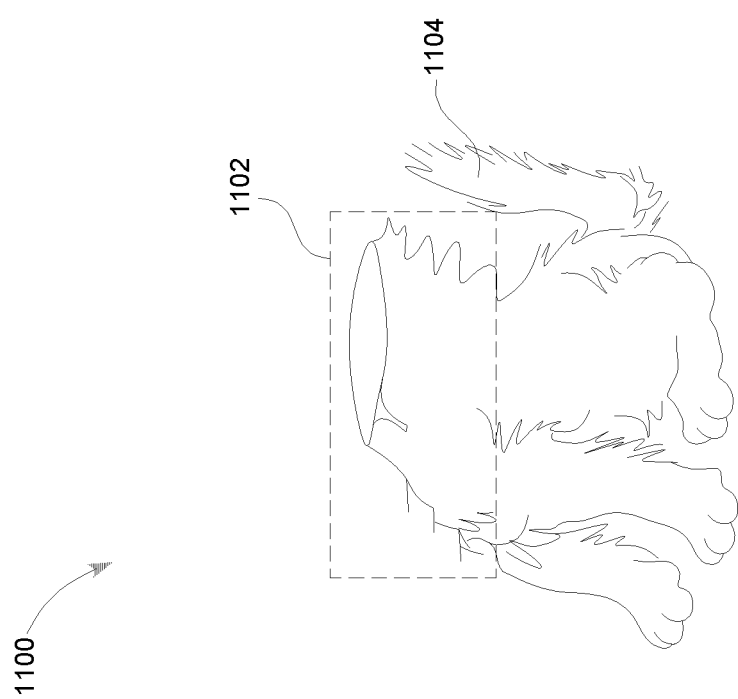

FIGS. 11 and 12 illustrate a 3D printing process according to some aspects of the present invention. In particular, FIGS. 11 and 12 illustrate the detection and correction of another defect on a 3D printed object. Specifically, FIG. 11 illustrates an object 1100 (e.g., a model dog) during a relatively late stage of the 3D printing process (and/or an object that was previously formed using, for example, a 3D printing process). Of particular interest is that a defect (or error) has manifested (or formed) on the partially completed object 1100, as shown in rectangle 1102.

As shown in FIG. 11, the defect is within (and/or occupies) several of the uppermost layers of the material that has been deposited (i.e., the defect is not isolated to the uppermost layer of the deposited material but rather extends through several layers of the material). In particular, several of the uppermost layers are inappropriately "shifted" (i.e., are not properly aligned with the layers below). The net effect of the defect is that the upper portion of the object 1100 as shown in FIG. 11 is "skewed" or "leaning." It should be noted that in the particular example shown in FIG. 11 only the main portion of the object 1100 (e.g., the upper torso of the dog) is affected by the defect, and a secondary portion 1104 (e.g., the tail of the dog) has been formed correctly.

Such an example may arise from, for example, the object 1100 being previously partially 3D printed (e.g., in a different 3D printer). As such, it should be noted that in some embodiments the 3D printing processes described may be performed on objects that were previously 3D printed. In such embodiments, the 3D printing process(es) performed on the previously printed object may be considered to be (or at least include) a remolding and/or reshaping of the previously printed object.

In some embodiments, the object 1100 is scanned using sensors such as those described above, the collected data is compared to the digital file being used by the 3D printer, and the 3D printer corrects the defect. As shown in FIG. 12, a removal tool 1106 (e.g., similar to those described above) engages with the object 1100 to remove the appropriate material. As is evident when comparing FIG. 12 to FIG. 11, the removal tool 1106 has removed all of the material that formed the defect (i.e., the material within box 1102 in FIG. 11). Thus, in the depicted embodiment, multiple layers of material have been removed from a portion of the object 1100. It should be noted that in the example shown in FIG. 12 the removal tool 1106 does not remove any material from the secondary portion 1104 of the object 1100 (i.e., the tail of the dog) because, for example, the defect being corrected did not affect that portion of the object 1100.

Thus, in some embodiments, in order to correct a defect, multiple layers of material may be removed from the object undergoing the 3D printing process. Additionally, the removal process may be selectively performed such that only appropriate portions of the object are affected. Although not shown, it should also be understood that the defect shown in FIG. 11 may be corrected in other ways by the removal tool 1106. For example, rather than removing all of the material associated with the defect, the removal tool 1106 may in effect remold (or reshape) the appropriate portion(s) of the object 1100 by only removing material that does not correspond to the desired final size/shape of the object (e.g., as represented by the digital file), in a manner similar to that described above with respect to FIGS. 6-9. In the particular example shown in FIG. 11, such a process may include only removing material that is in the right side of box 1102 (i.e., the material that is "leaning" outside of the desired shape of the object) to effectively reshape that portion of the object 1100. In this manner, the amount of material that is removed (and thus wasted) may be minimized.

Still referring to FIG. 12, after the defect has been corrected, a 3D printing process may be performed (e.g., initiated or continued) on the partially completed object 1100 to form the final, desired object, which is shown in FIG. 10.

Turning to FIG. 13, a flowchart diagram of an exemplary method 1300 for 3D printing an object is illustrated. Method 1300 begins (step 1302) with, for example, an appropriate 3D printer being prepared for a 3D printing process, the object to be 3D printed by the 3D printer being selected (and/or an indication of the selected object is received), and/or a 3D printing process being initiated. During the 3D printing process (e.g., before the completion of the 3D printing process), the partially completed (or at least partially completed) 3D printed object is scanned (step 1304). As described above, the scanning may be performed with sensors, such as cameras, ultrasonic modules, etc. coupled to (e.g., housed within) the 3D printer.

Based on the scanning of the partially completed 3D printed object, a defect (or error) on the partially completed object is detected (step 1306). The defect may be detected by comparing the data collecting during the scanning of the object to a digital file associated with the desired, final 3D printed object, which is used by the 3D printer to perform the 3D printing process.

The defect is corrected by a process that includes, for example, removing at least some material from the partially completed 3D printed object (step 1308). For example, if the defect includes unwanted material (e.g., material on the partially completed object that is not represented by the digital file), the unwanted material is removed. The removal of the material may be performed by a removal tool that is coupled to the 3D printer (e.g., coupled to the 3D printer head of the printer). The removal tool may include, for example, a drill, a grinder, a heating element, a laser, and/or a cutting instrument.

Method 1300 ends (step 1310) with, for example, the 3D printing process being completed in such a manner that the desired object is formed (e.g., based on the digital file). In some embodiments, the 3D printing process is continued while the defect is being corrected (e.g., in embodiments in which the removal tool is a separate component from the 3D printer head).

Although not shown in FIG. 13, in some embodiments, the object being 3D printed is repeatedly scanned to detect errors, even while any already detected errors are being corrected and/or while the 3D printing process is performed (or continued). In this manner, any defects may be corrected and/or the 3D printing process may be performed (and/or updated) based on the real-time condition of the object.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for 3D printing an object, comprising:

during a 3D printing process to form a 3D printed object using material dispensed by a nozzle of a 3D printer head, scanning an at least partially completed 3D printed object formed by the 3D printing process;

detecting an error resulting from a defect caused by the 3D printing process on the at least partially completed 3D printed object based on the scanning of the at least partially completed 3D printed object, wherein the detecting of the error includes comparing said scanned at least partially completed 3D printed object to a digital file associated with the 3D printed object, and wherein the error on the at least partially completed 3D printed object comprises material on the at least partially completed 3D printed object that is not represented by the digital file associated with the 3D printed object;

responsive to detecting the error and prior to a completion of the 3D printed object being fully formed, temporarily ceasing the 3D printing process;

causing, by an actuator integrated into the 3D printer head, a removal tool rotatably coupled to the 3D printer head to move from a stored position to a deployed position;

correcting the error on the at least partially completed 3D printed object, wherein the correcting of the error includes causing at least some material from the partially completed 3D printed object to be removed by the removal tool; and responsive to correcting the error, causing the removal tool to rotatably move from the deployed position to the stored position on the 3D printer head by the actuator and resuming the 3D printing process to the completion of the 3D printed object using the material dispensed by the nozzle of the 3D printer head.

2. The method of claim 1, wherein the scanning of the partially completed 3D printed object is performed by at least one sensor coupled to a 3D printer performing the 3D printing process.

3. The method of claim 1, wherein the removal tool includes at least one of a drill, a grinder, or a heating element.

4. The method of claim 3, wherein the at least one sensor includes at least one of a camera, an ultrasonic module, an X-ray sensor, or an infrared sensor.

5. A system for 3D printing an object, comprising:
a processor that
during a 3D printing process to form a 3D printed object using material dispensed by a nozzle of a 3D printer head, scans an at least partially completed 3D printed object formed by the 3D printing process;
detects an error resulting from a defect caused by the 3D printing process on the at least partially completed 3D printed object based on the scanning of the at least partially completed 3D printed object, wherein the detecting of the error includes comparing said scanned at least partially completed 3D printed object to a digital file associated with the 3D printed object, and wherein the error on the at least partially completed 3D printed object comprises material on the at least partially completed 3D printed object that is not represented by the digital file associated with the 3D printed object;
responsive to detecting the error and prior to a completion of the 3D printed object being fully formed, temporarily ceases the 3D printing process;
causes, by an actuator integrated into the 3D printer head, a removal tool rotatably coupled to the 3D printer head to move from a stored position to a deployed position;
causes the error on the at least partially completed 3D printed object to be corrected, wherein the correcting of the error includes removing at least some material from the partially completed 3D printed object by the removal tool; and
responsive to correcting the error, causes the removal tool to rotatably move from the deployed position to the stored position on the 3D printer head by the actuator and resumes the 3D printing process to the completion of the 3D printed object using the material dispensed by the nozzle of the 3D printer head.

6. The system of claim 5, wherein the scanning of the partially completed 3D printed object is performed by at least one sensor coupled to a 3D printer performing the 3D printing process.

7. The system of claim 5, wherein the removal tool includes at least one of a drill, a grinder, or a heating element.

8. The system of claim 6, wherein the at least one sensor includes at least one of a camera, an ultrasonic module, an X-ray sensor, or an infrared sensor.

9. A computer program product for 3D printing an object by a processor, the computer program product comprising a non-transitory computer-readable storage medium having computer-readable program code portions stored therein, the computer-readable program code portions comprising:
an executable portion that during a 3D printing process to form a 3D printed object using material dispensed by a nozzle of a 3D printer head, scans an at least partially completed 3D printed object formed by the 3D printing process;
an executable portion that detects an error resulting from a defect caused by the 3D printing process on the at least partially completed 3D printed object based on the scanning of the at least partially completed 3D printed object, wherein the detecting of the error includes comparing said scanned at least partially completed 3D printed object to a digital file associated with the 3D printed object, and wherein the error on the at least partially completed 3D printed object comprises material on the at least partially completed 3D printed object that is not represented by the digital file associated with the 3D printed object;
an executable portion that, responsive to detecting the error and prior to a completion of the 3D printed object being fully formed, temporarily ceases the 3D printing process;
an executable portion that causes, by an actuator integrated into the 3D printer head, a removal tool rotatably coupled to the 3D printer head to move from a stored position to a deployed position;
an executable portion that causes the error on the at least partially completed 3D printed object to be corrected, wherein the correcting of the error includes removing at least some material from the partially completed 3D printed object by the removal tool; and
an executable portion that, responsive to correcting the error, causes the removal tool to rotatably move from the deployed position to the stored position on the 3D printer head by the actuator and resumes the 3D printing process to the completion of the 3D printed object using the material dispensed by the nozzle of the 3D printer head.

10. The computer program product of claim 9, wherein the scanning of the partially completed 3D printed object is performed by at least one sensor coupled to a 3D printer performing the 3D printing process.

11. The computer program product of claim 9, wherein the removal tool includes at least one of a drill, a grinder, or a heating element.

12. The computer program product of claim 10, wherein the at least one sensor includes at least one of a camera, an ultrasonic module, an X-ray sensor, or an infrared sensor.

* * * * *